United States Patent [19]
Tsuji et al.

[11] Patent Number: 4,601,057
[45] Date of Patent: Jul. 15, 1986

[54] PATTERN ANALYZER

[75] Inventors: Shuji Tsuji, Nagaokakyo; Hiroshi Ito, Ibaraki; Kazuhiko Saka, Joyo, all of Japan

[73] Assignee: Omron Tateisi Electronics Co., Kyoto, Japan

[21] Appl. No.: 559,922

[22] Filed: Dec. 9, 1983

[30] Foreign Application Priority Data

Dec. 10, 1982 [JP] Japan ................... 57-217366

[51] Int. Cl.⁴ .............................................. G06K 9/38
[52] U.S. Cl. ......................................... 382/51; 358/282
[58] Field of Search ............................ 382/51, 53, 18; 358/282

[56] References Cited

U.S. PATENT DOCUMENTS 3,833,883  9/1974  Haupt et al. ................... 382/53
3,999,047  12/1976  Green ............................. 382/51
4,504,972  3/1985  Scherl et al. ................... 358/282

Primary Examiner—Leo H. Boudreau
Attorney, Agent, or Firm—Wegner & Bretschneider

[57] ABSTRACT

A pattern analyzer includes a sensor (19) for picking up an image of a pattern at a plurality of sampling points and for producing a shade signal representing the depth of shade at each sampling point. The sampled shade signals are temporarily stored in a memory (23) and, at the same time, are classified into different shade depths by a histogram forming circuit (30, 31, 32 and 33). The result of the classification is such that an amount of classified shade signals reaches a peak at two different shade depths. A threshold level determining circuit (34, 35, 36 and 37) is provided for determining a threshold level of shade depth between the two different shade depths. Also, a comparator (38, 39, 40 and 41) is provided for comparing the shade signals stored in the memory with the threshold level and for producing a 1-bit binary signal for each shade signal.

8 Claims, 6 Drawing Figures

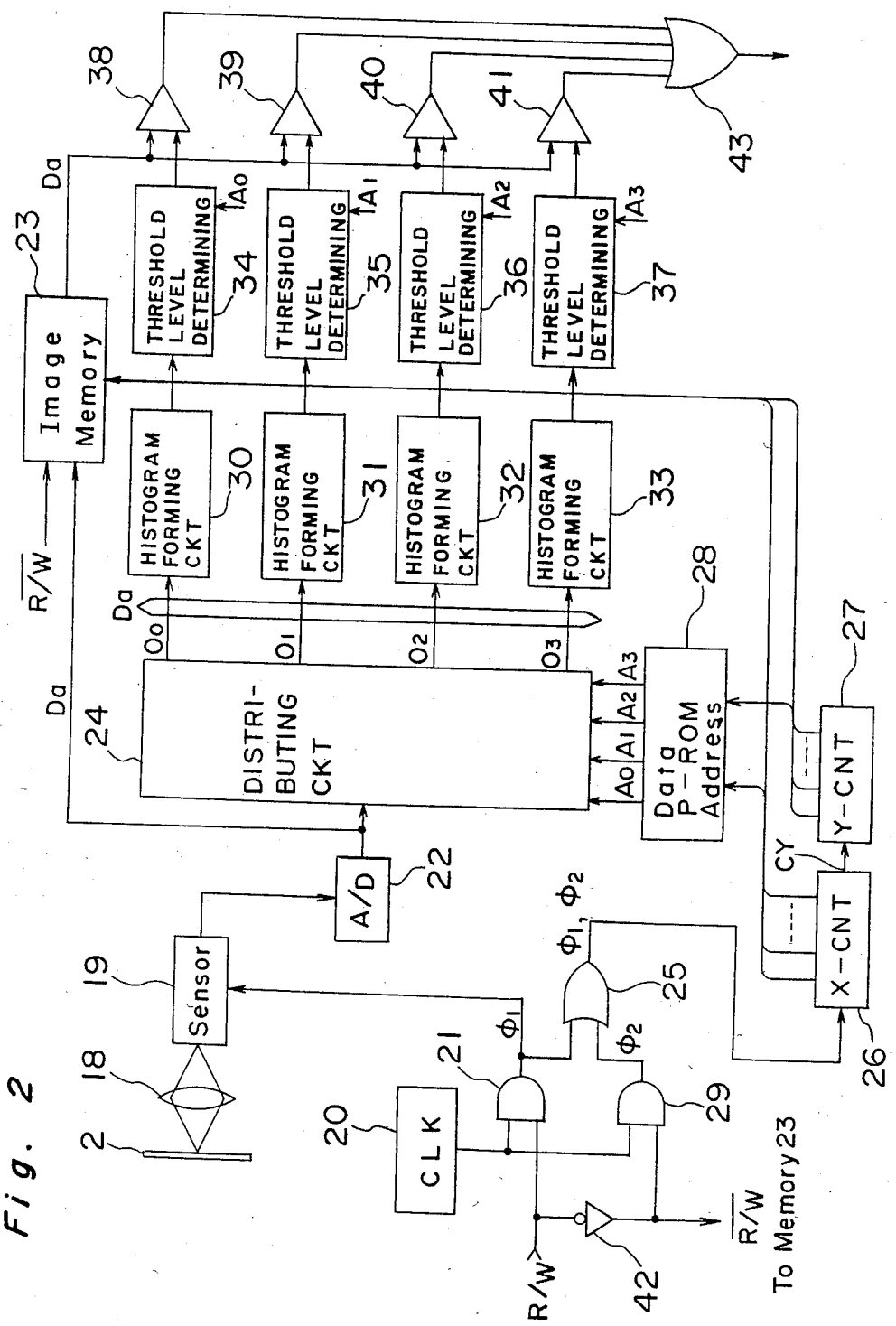

PATTERN ANALYZER

BACKGROUND OF THE INVENTION

1. Field of the Invention

The present invention relates to a pattern analyzer for analyzing a pattern of a seal or stamp on a bill, check or the like in a binary representation, and for detecting whether or not the bill in question is true or counterfeit, by way of a comparison of the analyzed result of a seal of the bill in question with stored data indicating the analyzed result of a true seal previously obtained.

2. Description of the Prior Art

It is known in the art to analyze a pattern by the steps of reading the pattern by a reading device, obtaining shade signals indicating the depth of shade of color at sampling points, and converting the shade signal at each sampling point to an analyze signal in binary form representing either black or white.

To discriminate automatically whether or not a pressure marked seal or stamp on a bill is genuine or counterfeit, the prior art method follows the steps of obtaining analyze signals of the stamp in question at sampling points through the above-mentioned steps, and comparing analyze signals with previously memorized signals representing the analyzed result of the genuine stamp mark.

According to one example of the prior art, the shade signal at each sampling point is converted to an analyze signal in such a manner that the shade signal is compared with a predetermined fixed threshold level to divide the shade signal typically between two types of signals, for example, "1" representing black, and "0" representing white. In this case, the analyze signal is a 1-bit binary signal. Thus, an image of the stamp mark is recognized by means of a plurality of 1-bit analyze signals, such as in a newspaper picture drawn with only black and white dots.

When stamping a mark on bills with an application of pressure, the stamped marks on the bills may have different brightness distributions in repeated stampings, due to the differences in various factors, such as stamping pressure, stamping angle, hardness of the base on which the bill is placed, and the type and amount of ink applied to the stamp face. Furthermore, a change in the amount of illumination directed to the stamped mark will also cause a different brightness distribution. Such differences result in different shade signals.

Since the threshold level is fixed, the analyze signals according to the prior art may result in inconsistencies, for example that one stamp mark has a wide area occupied with "1s", whereas another stamp mark has a small area occupied with "1s", although the stamp used is the same. Furthermore, such an inconsistency may also occur when stamp marks are placed on bills of different colors.

Thus, the pattern analyzer according to the prior art is not suitable for discrimination between genuine and counterfeit stamp marks.

SUMMARY OF THE INVENTION

The present invention has been developed with a view to substantially solving the above described disadvantages and has for its essential object to provide an improved pattern analyzer which can discriminate between genuine and counterfeit stamp marks with high reliance even when the stamp marks are placed on bills of different colors, or even when one stamp mark has different brightness distribution than other stamp marks, so long as the stamp used is the same.

In accomplishing these and other objects, the pattern analyzer according to the present invention comprises a sensor for picking up an image of a pattern at a plurality of sampling points and for producing a shade signal representing the depth of shade at each sampling point. The sampled shade signals are temporarily stored in a memory and, at the same time, are classified into different shade depths by a histogram forming circuit. The result of the classification is such that the graph of a group of classified shade signals shows a peak at two different shade depths. A threshold level determining circuit is provided for determining a threshold level of shade depth between the two different shade depths. Also, a comparator is provided for comparing the shade signals stored in the memory with the threshold level and for producing a 1-bit binary signal for each shade signal.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIG. 2 is a block diagram of a camera employed in the block diagram of FIG. 1;

DESCRIPTION OF THE PREFERRED EMBODIMENT

Figure 1:
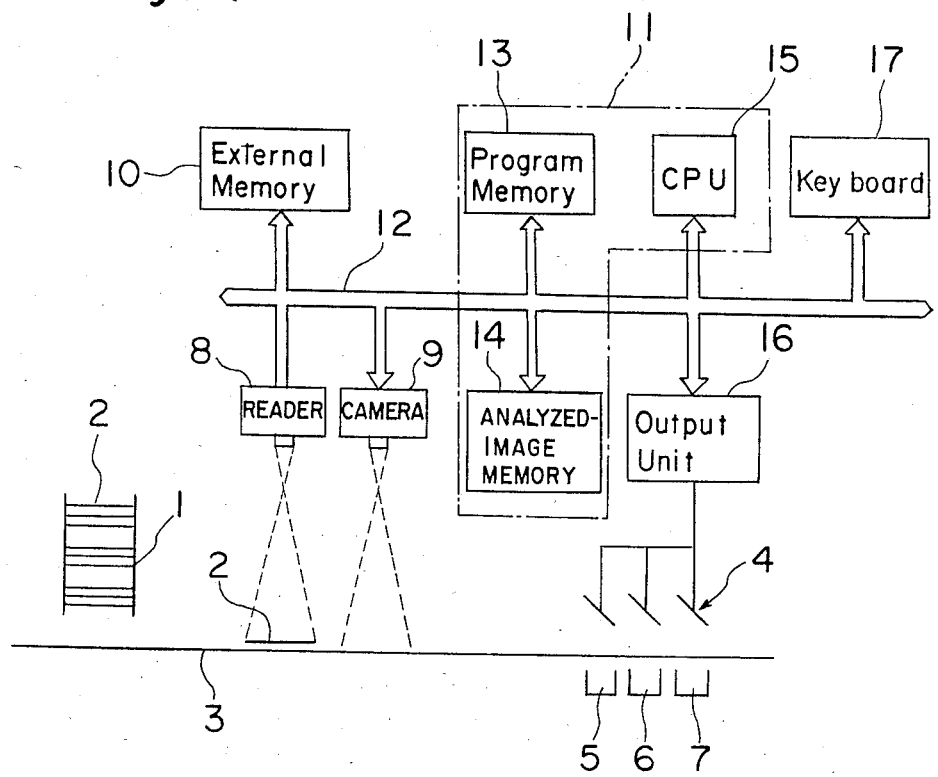
FIG. 1 is a block diagram of a pattern analyzer according to the present invention.

Referring to FIG. 1, a block diagram of a pattern analyzer according to the present invention is shown. The pattern analyzer shown comprises a casing 1 containing a stack of bills 2. Each bill has an identification number and a stamp mark. The bills are ejected out from the casing 1 one sheet at a time, and are conveyed, when viewed in FIG. 1, towards rightward direction on a belt 3 to pass through various stations which are: an identification number reading station defined by a reader 8 for optically or magnetically reading the identification number on the bill; a stamp mark reading station defined by a camera 9 for picking up an image of the stamp mark on the bill; and a sorting station defined by a sorter 4 and receiving trays 5, 6 and 7 for sorting the bills into bills with genuine stamp marks, bills with counterfeit stamp marks, and bills with indiscernible stamp marks.

The identification number read by reader 8 is transferred to an external memory 10 via a data bus 12, and the image picked up by camera 9 is transferred to image processor 11 via data bus 12.

In the external memory 10 are previously stored 1-bit analyzed signals for a plurality of stamp marks. In response to the identification number read by reader 8, external memory 10 produces 1-bit analyzed signals of a corresponding stamp mark. Thus produced 1-bit analyzed signals are transferred via data bus 12 to image processor 11.

The image processor 11 comprises a program memory 13, an analyzed-image memory 14 and a CPU (central processing unit) 15. The program memory 13 is provided for storing programs (FIG. 6) for discriminating among genuine, counterfeit and indiscernible stamp marks. The analyzed-image memory 14 is provided for storing the 1-bit analyze signals of a true stamp mark from the external memory 10, and also for storing 1-bit analyze signals of the stamp mark in question as picked up and analyzed by the camera 9. In accordance with the programs in program memory 13, CPU 15 carries out a series of calculations and procedures concerning the stamp discrimination. Furthermore, with the use of the result of the discrimination, CPU 15 controls the movement of the sorter 4 through an output unit 16. A key board 17 is provided for inputting various data.

Referring to FIG. 2, a block diagram of the camera 9 is shown. An image of a stamp mark on the bill 2 is formed on an image pick-up sensor 19 through a suitable optical arrangement 18. The image formed on the sensor 19 is scanned by X- and Y-counters (not shown) driven by clock pulses $\phi 1$ produced from a clock circuit 20 through an AND gate 21, to serially produce shade signals at sampling points, i.e., at points corresponding to the picture elements. The shade signals are in analog form, and each represents the depth of shade at the respective sampling point. The shade signals from the sensor 19 are sequentially applied to an A/D (analog-to-digital) converter 22 which sequentially produces digital shade signals Da, each being 8-bits long. Thus, the digital shade signal Da has a gradation of 256 grades between black (grade 0) and white (grade 255).

The clock pulses $\phi$ from AND gate 21 are also applied through an OR gate 25 to an X-axis counter 26 having its carry terminal CY connected to a Y-axis counter 27. It is to be noted that X- and Y-counters 26 and 27 have the same counting capacity as the counters provided for scanning the sensor 19 and, therefore, a composite signal produced from X- and Y-counters 26 and 27 is in synchronized relationship with the scan effected on the sensor 19.

The composite signal from X- and Y-counters 26 and 27 is applied to an image memory 23 for memorizing the digital shade signals Da in the scanned order. The composite signal is also applied to a P-ROM 28 which has four outputs A0, A1, A2 and A3. The area on sensor 19 is previously divided into four sections, and when the scan is effected on the first section, output A0 produces "HIGH" and other outputs A1–A3 produce "LOW". Similarly, when the scan is effected on the second, third or fourth section, output A1, A2 or A3 produces "HIGH", respectively, with the remaining outputs producing "LOW". The outputs A0–A3 are connected to a distributing circuit 24, a detail of which is described hereinbelow.

Figure 3:
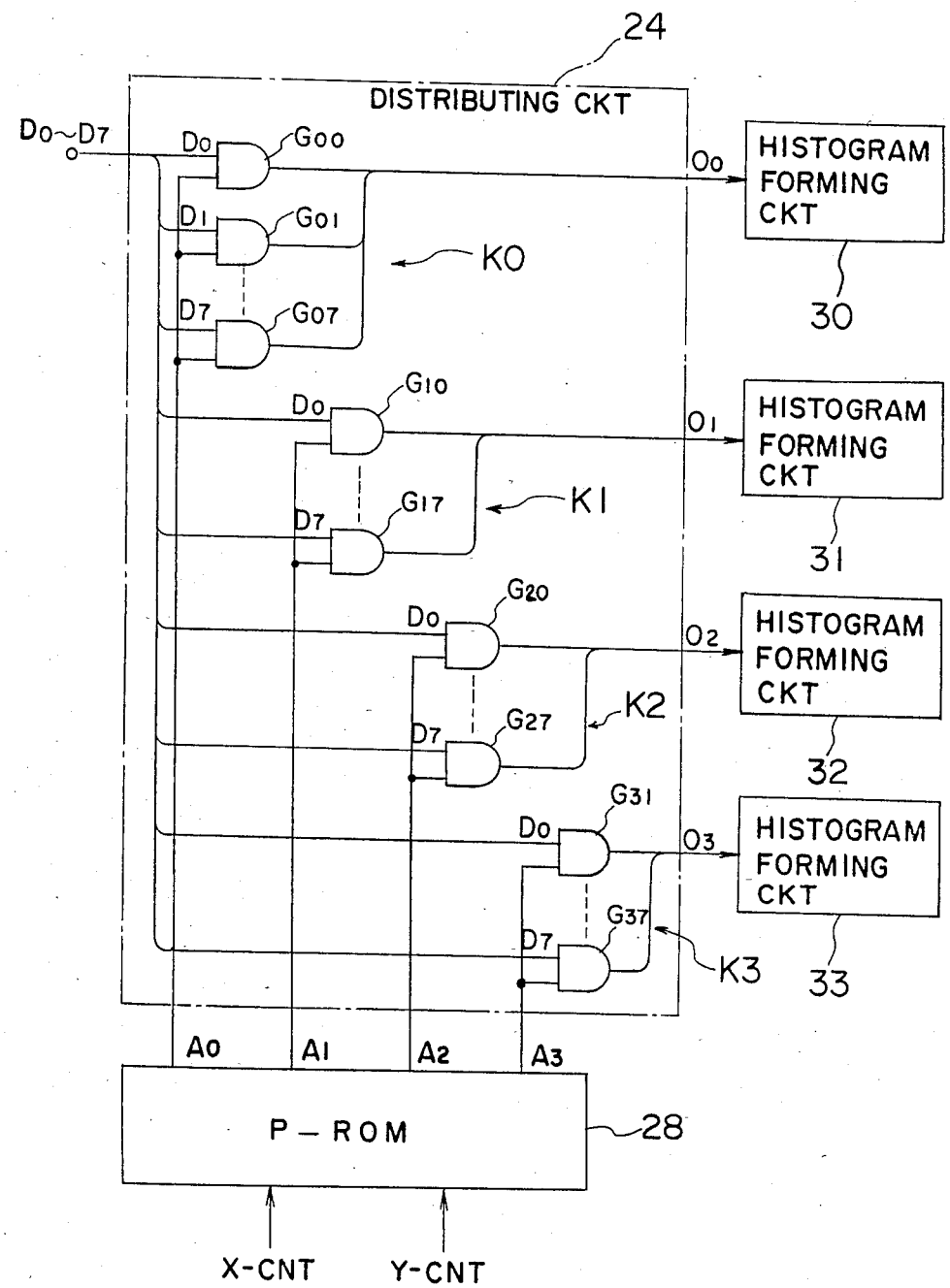
FIG. 3 is the circuit diagram of the distributing circuit shown in FIG. 2.

Referring to FIG. 3, the distributing circuit 24 has four AND gate arrays K0, K1, K2 and K3, each array including eight AND gates. For example, AND gate array K0 includes AND gates G00, G01, . . . , and G07, each AND gate having two inputs. One input of each of the AND gates is connected to A/D converter 22 so as to receive 8-bit shade signals Da and the other input thereof is connected to the output A0 of P-ROM 28. The outputs from AND gates G00, G01, . . . , and G07 are connected to output O0 for producing 8-bit shade signals Da when the scan is effected in the first section.

Likewise, AND gates in array K1 receive 8-bit shade signals Da, and are enabled by "HIGH" from the output A1. Thus, during the scan in the second section, output O1 connected to the AND gates in array K1 produces 8-bit shade signals Da. Furthermore, during the scan in the third section, output O2 connected to the AND gates in array K2 produces 8-bit shade signals Da, and during the scan in the fourth section, output O3 connected to the AND gates in array K3 produces 8-bit shade signals Da, thereby distributing the 8-bit shade signals Da in four different paths.

Figure 4A:
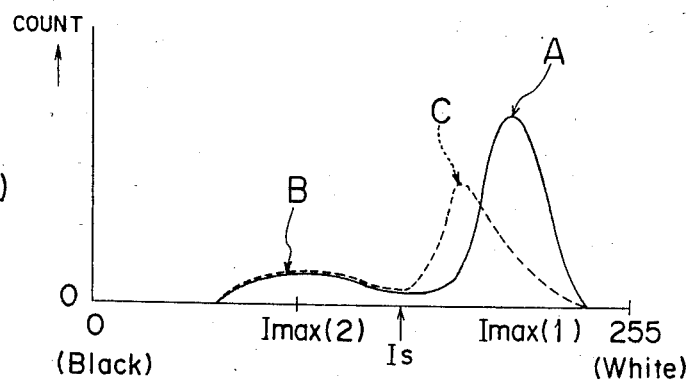
FIG. 4 is a diagrammatic view showing, in row (a), a graph representing the distribution of the colors black and white and intermediate colors therebetween in one section of a pattern, and in row (b) the structure of a RAM for giving a numerical outline of such a graph.
Figure 4B:
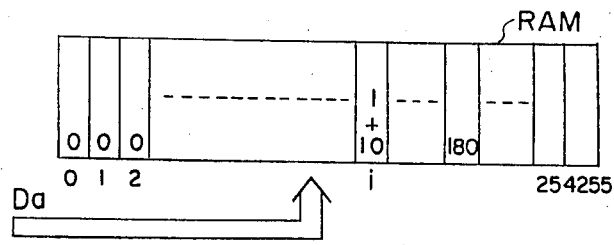

Outputs O0, O1, O2 and O3 are connected to histogram forming circuits 30, 31, 32 and 33, respectively. Each histogram forming circuit, such as circuit 30, is defined by a RAM having 256 storing areas, such as shown in FIG. 4, row (b), in correspondence to 256 grades of the 8-bit shade signal Da, each area capable of storing a number and initially carrying zero. When the circuit 30 receives an 8-bit shade signal Da indicating ith grade, "1" is added to the content of the area corresponding to the ith grade and the result of the addition is placed in the same area. Thus, when the scan in the first section is completed, each of the 256 storing areas carries a number indicating the count of shade signals representing the depth of shade for that storing area. When a histogram is drawn with the group of counted numbers, there will be two peak points A and B, as shown in FIG. 4, row (a). The graph can be analyzed such that the peak point A corresponds, e.g., to the background color which may be close to white, and peak point B corresponds, e.g., to the ink color of the stamped mark. Accordingly, in the histogram forming circuits, the shade signals Da are classified into different shade depths.

The histogram forming circuits 30, 31, 32 and 33 are connected, respectively, to threshold level determining circuits 34, 35, 36 and 37, for determining a threshold level between two peak points. According to one embodiment, the threshold level is determined as a center point between two grades holding the two peak points. If this is applied to the example shown in FIG. 4, the threshold level Is can be defined as:

$$Is = \tfrac{1}{2}[Imax(1) + Imax(2)]$$

wherein Imax(1) is the grade holding the peak point A, and Imax(2) is the grade holding the peak point B. Thus, in the threshold level determined circuit 34, the above calculation is carried out.

Since there are four threshold level determining circuits, a threshold level is determined individually for the four different sections.

It is to be noted that the threshold level Is can be determined in any other dividing ratio or any other formula, so long as the threshold level Is falls in between two grades holding the two peak points.

Then, in the next stage, the sampled points which can be classified in grades above the threshold level Is are all considered as white and, therefore, are given with a binary code "0" representing white, whereas the sampled points which can be classified in grades below the threshold level Is are all considered as black and, therefore, are given with a binary code "1" representing black.

For this classification, threshold level determining circuits 34, 35, 36 and 37 are connected to comparators 38, 39, 40 and 41, which also receive 8-bit shade signals Da from the image memory 23.

The operation of the camera shown in FIG. 2 is controlled by image read/write signal R/W from CPU 15. The read/write signal R/W is applied to AND gate 21 and also to an inverter 42, from which an inverted read/write signal $\overline{R/W}$ is produced. The inverted read/write signal $\overline{R/W}$ is applied to AND gate 29 and also to image memory 23.

When the read/write signal R/W is "HIGH", AND gate 21 is enabled, and AND gate 29 is disabled. Thus, during this period, clock pulses φ1 are applied to the sensor 19 for effecting the image reading by sequentially producing the shade signal Da and, at the same time, clock pulses φ1 are also applied through OR gate 25 to X-counter 26 for effecting the image writing by recording the shade signals Da in the image memory 23. Furthermore, during the same period of time, distributing circuit 24, histogram forming circuits 30, 31, 32 and 33, and threshold level determining circuits 34, 35, 36 and 37 are actuated to determine an appropriate threshold level for each section.

Then, when the read/write signal R/W is changed to "LOW", inverted read/write signal $\overline{R/W}$ becomes "HIGH". Thus, AND gate 21 is disabled, and AND gate 29 is enabled. Furthermore, the image memory 23 is turned to a reproducing mode by the inverted read/write signal $\overline{R/W}$. Thus, during this period, clock pulses φ2 are applied through OR gate 25 to X-counter 26 for sequentially producing the shade signals Da stored in the image memory 23.

During when the inverted read/write signal $\overline{R/W}$ is "HIGH", the outputs A0-A3 of P-ROM28 produce "HIGH" one at a time sequentially in the manner described above to sequentially actuate threshold level determining circuits 34, 35, 36 and 37. Thus, when the threshold level determining circuit 34 is actuated by the "HIGH" from the output A0, image memory 23 produces the shade signals Da which belong to the first section. Thus, the shade signals Da of the first section are compared in comparator 38 with the threshold level Is(1) determined by the circuit 34. As a result, the comparator 38 produces analyze signals in binary form representing either black or white. In other words, at the comparator 38, the shade signals Da in the first section are compared with the determined threshold level Is to divide the shade signal Da typically between two types of signals, "1" representing black, and "0" representing white.

Then, when the next threshold level determining circuit 35 is actuated by the "HIGH" from the output A1, image memory 23 produces the shade signals Da which belong to the second section. Thus, the shade signals Da of the second section are compared in comparator 39 with a threshold level Is(2) determined by the circuit 35, thereby producing analyze signal from the comparator 39.

In this manner, the shade signals Da of the third and fourth sections are, respectively, compared in comparators 40 and 41 sequentially.

The outputs of the comparators 38, 39, 40 and 41 are connected to a OR gate 43. Thus, during when the inverted read/write signal $\overline{R/W}$ is "HIGH", the OR gate 43 sequentially produces analyze signals of one stamp mark, and the produced analyze signals are applied to analyzed-image memory 14.

Next, the overall operation of the pattern analyzer of the present invention will be described.

When a bill 2 is transferred on the belt 3 to the identification number reading station, the reader 8 reads the identification number and, thereafter, the bill 2 is further transferred to the stamp mark reading station at which the camera 9 reads the stamp mark in the following procedure.

First, by the read/write signal R/W from CPU 15, clock pulses φ are applied through AND gate 21 to scan the sensor 19, thereby producing shade signals which are A/D converted to 8-bit long shade signals Da to indicate the depth of shade in 256 grades. The shade signals Da are temporarily stored in image memory 23 and, at the same time, are directed to distributing circuit 24, for distributing the shade signals Da to four different histogram forming circuits 30, 31, 32 and 33 such that histogram forming circuit 30 receives shade signals Da in the first section, histogram forming circuit 31 receives shade signals Da in the second section, and so on.

In each of the histogram forming circuits 30, 31, 32 and 33, the number of shade signals Da in each grade is counted. The result of the count is stored in the RAM, thereby forming a histogram, such as shown in FIG. 4, one for each histogram forming circuit. When the histogram is formed, a threshold level is determined, one for each histogram, through the steps described below in connection with FIG. 5.

Figure 5:
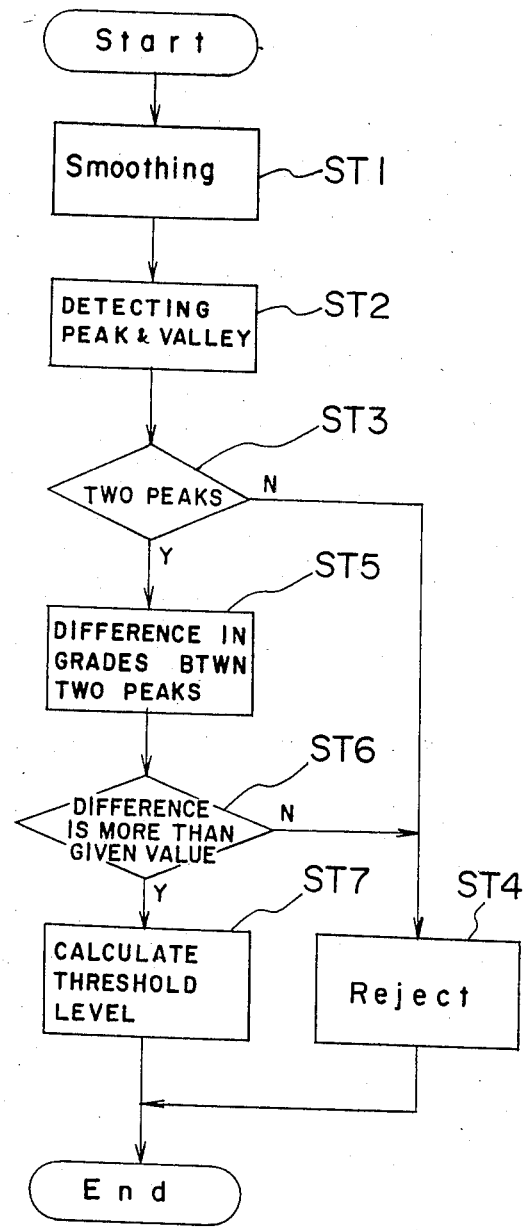
FIG. 5 is a flow chart for calculating a reference level.

FIG. 5 shows a flow chart for determining a threshold level. At step ST1, to prevent the trivial variations of the shade signals from being adversely detected as peak points, a window size is given to the shade signal to effect a smoothing process in which the occurrence frequency is averaged within the window. Then, at step ST2, by reading the numbers carried in RAM, peak and valley points are detected, and at step ST3, it is decided whether or not there are two peak points. If there are no two peak points, the program proceeds to step ST4 at which it is so determined that the image within that section is plain, containing no stamp mark, and, therefore, the data are rejected and the program is ended. Contrary, if there are two peak points, the program proceeds to step ST5 at which a difference in grades between two peaks, i.e., Imax(1)−Imax(2) measured in x-axis direction in the graph of FIG. 4, is calculated. And, at step ST6, it is decided whether the difference is greater than a given value, or not. If the difference is smaller than the given value, such as shown by a dotted line C in the graph of FIG. 4, it is assumed that the peaks are not representing the background and the stamp mark and, therefore, the data are rejected (step ST4) and the program is ended. If the difference is greater than the given value, a threshold level is calculated at step ST7 in a manner described above.

The above described steps ST1 to ST7 for determining the threshold level is carried out in each of the threshold level determining circuits 34, 35, 36 and 37, and the determined threshold levels for one stamp mark are not necessarily the same. For example, when the stamp is pressed in the wrong way, for example, tilted relative to the surface of the bill, the stamp may leave on the bill a marking including thick-inked and thin-inked portions. In such a case, the threshold level for the thick-inked portion differs from that for the thin-inked portion.

After obtaining four threshold levels, the read/write signal R/W is changed to "LOW", and the inverted read/write signal $\overline{R/W}$ becomes "HIGH". Thus, the shade signals Da temporarily stored in the image memory 23 are read out sequentially, and are applied to each of the comparators 38, 39, 40 and 41. During the shade signals Da of the first section are produced, the comparison is carried out in comparator 38 with the first threshold level from the circuit 34. As a result, comparator 38 produces 1-bit analyze signals each representing either black or white. Then, during the shade signals Da of the second section are produced, the comparison is carried out in comparator 39 with the second threshold level from the circuit 35, and at the same time, the comparator 39 produces a series of analyze signals. In this manner, comparators 40 and 41 produce analyze signals as the shade signals of the third and fourth sections are produced.

Figure 6:
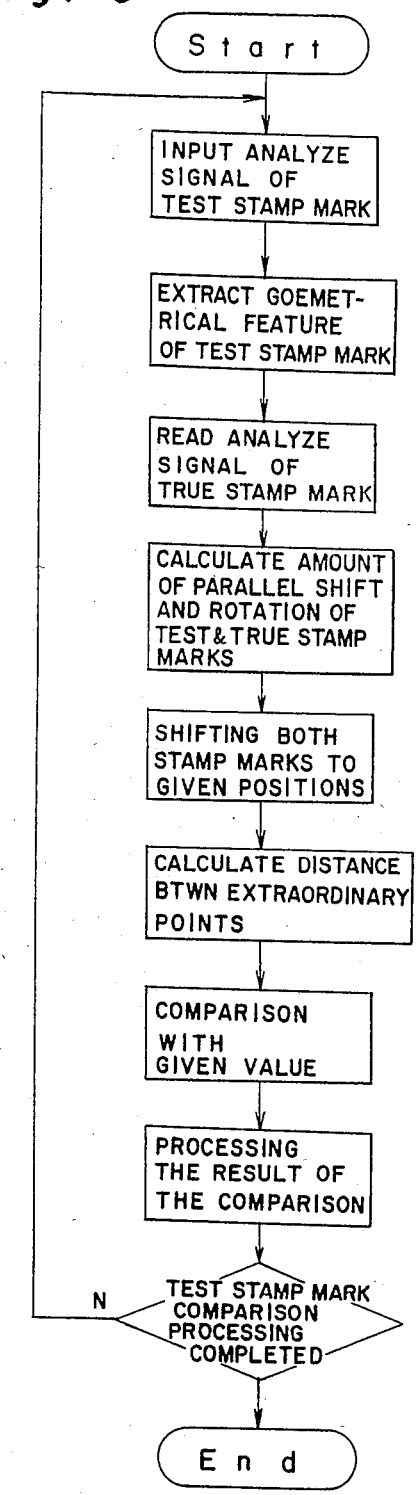
FIG. 6 is a flow chart for effecting the comparison between the analyzed signals at sampling points and the originally stored signal.

The analyzed signals from OR gate 43 are stored in analyzed-image memory 14 and are compared with previously stored analyzed signals of the true stamp mark in accordance with the flow chart shown in FIG. 6, to determine whether or not the stamp mark in question is genuine or counterfeit. Since the flow of FIG. 6 is known in the art, a detailed description therefor is omitted for the sake of brevity.

In the above described embodiment, the image picked by the sensor 19 is divided into four sections, but it can be divided into any other number of sections. If it is divided into a greater number of sections, the pattern can be analyzed in greater detail.

Although the present invention has been fully described with reference to the preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A pattern analyzer comprising:
   image pick-up means for picking up an image of a pattern at a plurality of sampling points and for producing a shade sample representing the depth of shade at each sampling point;
   memory means for storing said shade signals;
   classifying means for classifying said shade signals into different shade depths, with the result that a graph of the classified shade signals reaches a peak at two different shade depths;
   threshold level determining means for determining a threshold level of shade depth between said two different shade depths;
   comparing means for comparing said shade signals stored in said memory means with said threshold level and for producing a 1-bit binary signal for each shade signal; and
   distributing means for distributing said shade signals into a plurality of paths, each path carrying shade signals from a section of said image.

2. A pattern analyzer as claimed in claim 1, wherein said classifying means, threshold level determining means and comparing means are provided in each path.

3. A pattern analyzer as claimed in claim 1, further comprising an analog-to-digital converter for converting said shade signals into digital form.

4. A pattern analyzer as claimed in claim 1, wherein said distributing means comprises an X-axis counter, a Y-axis counter, and a date P-ROM address.

5. A pattern analyzer as claimed in claim 1, wherein said image pick-up means is a single sensor.

6. A pattern analyzer as claimed in claim 1, wherein said classifying means is at least one histogram forming circuit, said threshold level determining means is at least one circuit, and said comparing means is at least one comparator.

7. A pattern analyzer comprising
   image pick-up means for picking up an image of a pattern at a plurality of sampling points and for producing a shade signal representing the depth of shade at each sampling point, said image pick-up means being a single sensor;
   memory means for storing said shade signals;
   classifying means for classifying said shade signals into different shade depths, with the result that a graph of classified shade signals reaches a peak at two different shade depths;
   threshold level determining means for determining a threshold level of shade depth between two different shade depths;
   comparing means for comparing said shade signals stored in said memory means with said threshold level and for producing a 1-bit binary signal for each shade signal;
   an analog-to-digital converter for converting said sahde signals into digital form;
   addressing means for producing an address signal representing a section of said image; and
   distributing means for distributing said shade signals from said single sensor into a plurality of paths, each path carrying shade signals from a section of said image and having said classifying means, said threshold level determining means, and said comparing means provided therein, said plurality of paths dependent on said address signals whereby a histogram is formed for each section determined by said addressing means.

8. A pattern analyzer comprising
   image pick-up means for picking up an image of a pattern at a plurality of sampling points and for producing a shade signal representing the depth of shade at each sampling point, said image pick-up means being a single sensor;
   memory means for storing said shade signals;
   classifying means for classifying said shade signals into different shade depths, with the result that a graph of the classified shade signals reaches a peak at two different shade depths, said classifying means being at least one histogram forming circuit;
   threshold level determining means for determining a threshold level of shade depth between said two different shade depths, said threshold level determining means being at least one circuit;
   comparing means for comparing said shade signals stored in said memory means with said threshold level and for producing a 1-bit binary signal for each said signal, said comparing means being at least one comparator;
   distributing means for distributing shade signals into a plurality of paths, each path carrying shade signals from a section of said image and having said classifying means, said threshold level determining means, and said comparing means provided therein, said distributing means comprising an X-axis counter, a Y-axis counter, and a data P-ROM address; and
   an analog-to-digital converter for converting said shade signals into digital form.

* * * * *